(12) United States Patent
Mikami et al.

(10) Patent No.: US 8,098,548 B2
(45) Date of Patent: Jan. 17, 2012

(54) OPTICAL HEAD AND OPTICAL DISK APPARATUS

(75) Inventors: Hideharu Mikami, Kawasaki (JP);
Harukazu Miyamoto, Higashimurayama (JP); Takahiro Kurokawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 12/419,421

(22) Filed: Apr. 7, 2009

(65) Prior Publication Data

US 2009/0316539 A1 Dec. 24, 2009

(30) Foreign Application Priority Data

Apr. 11, 2008 (JP) ................................. 2008-103010

(51) Int. Cl.
*G11B 7/00* (2006.01)
(52) U.S. Cl. ................... 369/44.23; 369/44.32
(58) Field of Classification Search ........................ None
See application file for complete search history.

(56) References Cited

U.S. PATENT DOCUMENTS

| | | | | |
|---|---|---|---|---|
| 5,218,594 A * | 6/1993 | Tanno | ........................... | 369/100 |
| 6,567,365 B1 * | 5/2003 | Hendriks et al. | ......... | 369/112.02 |
| 7,342,867 B2 * | 3/2008 | Ito et al. | ................... | 369/112.01 |
| 7,349,298 B2 * | 3/2008 | Kuze et al. | .................. | 369/44.29 |
| 7,715,287 B2 * | 5/2010 | Shimano et al. | ........... | 369/44.23 |
| 7,750,276 B2 * | 7/2010 | Miyamoto et al. | ......... | 250/201.5 |
| 2003/0007431 A1 * | 1/2003 | Tateishi | ..................... | 369/44.23 |
| 2004/0066717 A1 * | 4/2004 | Kuze et al. | ................. | 369/44.29 |
| 2005/0041540 A1 * | 2/2005 | Tanaka | ........................ | 369/44.15 |
| 2005/0254391 A1 * | 11/2005 | Nagatomi et al. | ....... | 369/109.02 |
| 2007/0274171 A1 * | 11/2007 | Shimano et al. | ........... | 369/44.23 |
| 2008/0067321 A1 | 3/2008 | Miyamoto et al. | | |
| 2009/0046559 A1 * | 2/2009 | Jeong et al. | .................... | 369/103 |
| 2010/0039917 A1 * | 2/2010 | Ide | ................................ | 369/100 |

FOREIGN PATENT DOCUMENTS

| JP | 5-342678 A | 12/1993 |
|---|---|---|
| JP | 6-68470 A | 3/1994 |
| JP | 6-223433 A | 8/1994 |

* cited by examiner

*Primary Examiner* — Peter Vincent Agustin
(74) *Attorney, Agent, or Firm* — Mattingly & Malur, PC

(57) ABSTRACT

An interference type optical head and an optical disk apparatus which have a signal amplification effect and can be manufactured in sizes comparable to conventional optical heads. In an optical disk apparatus that performs signal amplification by making a light, which is used as a reference light without being irradiated on an optical disk and, interfere with reflected light from the optical disk, a corner cube prism that reflects the reference light is mounted on the same actuator as an objective lens. A movable portion adjusts the optical path length of the interfering light in accordance with the kind of optical disk being read and the recording layer being read. A wedge prism may be used for the movable portion, and a spherical aberration correction lens and an optical path length adjusting component may be moved integrally.

9 Claims, 10 Drawing Sheets

401  402  403  116

OPTICAL HEAD AND OPTICAL DISK APPARATUS

BACKGROUND OF THE INVENTION

1. Field of the Invention

The present invention relates to achieving a higher S/N for readout signals of an optical disk apparatus.

2. Background Art

With the commercialization of Blu-ray Disc, which uses a blue laser diode and a high-NA objective lens, optical disks have more or less reached a limit in terms of the resolution of an optical system. The multi-layering of recording layers is viewed as holding promise in further increasing capacity in the future. With respect to such multi-layered optical disks, it is necessary that the detected quantity of light from each recording layer be substantially equal. Thus, the reflectivity from certain recording layers must be made smaller. However, along with the increase in the capacity of optical disks, data transfer speed also continues to increase due to the need for higher dubbing speed for video and the like. Thus, it is becoming difficult to secure an adequate S/N ratio for readout signals as is. Therefore, in order to simultaneously advance the multi-layering of recording layers and the increase in speed in the future, achieving higher S/N for detected signals becomes a requirement.

Techniques relating to achieving higher S/N for readout signals of optical disks are described, for example, in Patent Document 1, Patent Document 2, Patent Document 3, and the like. Patent Document 1 and Patent Document 2 relate to achieving higher S/N for readout signals of magneto-optical disks. They divide light from a semiconductor laser before it is irradiated on an optical disk. The light that is not irradiated on the optical disk is combined and made to interfere with light reflected from the optical disk. They thus aim to amplify the amplitude of weak signals by increasing the quantity of light of the light that is not irradiated on the optical disk. In differential detection of light transmitted and reflected by a polarization beam splitter that is conventionally used in signal detection for magneto-optical disks, detection is performed essentially by causing interference between an original incident polarization component and a polarization component, which occurs due to polarization rotation caused by a magneto-optical disk and which is orthogonal to the incident polarization direction, and by amplifying the orthogonal polarization component with the incident polarization. Therefore, signals can be amplified if the original incident polarization component is amplified. However, the light intensity that is incident on an optical disk must be kept at or below a certain level so that data is not erased or overwritten. In contrast, in the related art described above, a signal light and interference light are separated in advance. The latter is made to interfere with the signal light without being focused on the disk so that the intensity of the light that is made to interfere for signal amplification can be increased irrespective of the light intensity on the surface of the disk. Thus, in principle, the more the intensity is increased within a range that the light intensity would permit, the more the S/N ratio can be increased compared to the noise of an amplifier that carries out voltage conversion of a photoelectric current from a photodetector. Patent Document 3 relates to achieving higher S/N for readout signals of optical disks employing a photochromic medium. As with Reference Document 1 and Reference Document 2, it aims to amplify signals by having light that is not irradiated on an optical disk interfere with reflected light from the optical disk. With respect to optical disks employing a photochromic medium, too, degradation of the medium is faster the higher the intensity of the incident light for signal readout is. Therefore, there is a limit to the intensity of the light irradiated on the recording medium as with the magneto-optical disks mentioned above.

In Patent Document 1, two lights are made to interfere, and the interference light intensity is detected. In so doing, the optical path length of the disk reflected light that is made to interfere is made variable so as to secure interference signal amplitude. In Patent Document 2 and Patent Document 3, differential detection is also performed in addition to interference light intensity detection. Thus, the intensity component of any light that does not contribute to the signal is cancelled out, and signal amplitude is doubled, thereby achieving higher S/N. In the differential detection of these cases, a non-polarization beam splitter is used.

[Patent Document 1] JP Patent Publication (Kokai) No. 5-342678 A (1993)

[Patent Document 2] JP Patent Publication (Kokai) No. 6-223433 A (1994)

[Patent Document 3] JP Patent Publication (Kokai) No. 6-068470 A (1994)

SUMMARY OF THE INVENTION

In the related art described above, in order to properly obtain an amplification effect by interference of two lights, it is necessary that the optical path length difference between the two lights that are made to interfere be within the coherence length of the light. Compared to the fluctuation in the optical path length difference of approximately 1.2 mm caused by surface position fluctuation in current optical disks, the coherence length of laser diodes used in current optical disk apparatuses is generally shorter. Further, the optical path length also varies with the kind of optical disk being read, variations in cover layer thickness, the position of a recording layer in a multi-layered optical disk including a plurality of recording layers, and the like. Therefore, due to the requirements above, it is necessary to control the optical path length of the light that is made to interfere with the signal light. No particular consideration is given with respect to such a control method in the related art mentioned above. However, it is by no means an obvious issue. For example, in Patent Document 1, it is mentioned that the optical path length is adjusted by moving a triangular prism that is inserted into the optical path. However, if this is done through, for example, an actuator such as a voice coil motor or the like, the optical axis direction would change due to the vibration caused by the driving thereof. As a result, the degree of interference with the signal light would drop significantly, and it would become impossible to obtain signals that are amplified properly. As an actuator in which such vibrations are suppressed, one that uses a piezoelectric actuator may be considered. However, a device that would exhibit performance commensurate with the magnitude and speed of the surface position fluctuation of optical disks mentioned above would not be suitable for incorporation into an optical head in terms of its size.

An object of the present invention is to provide an interference-type optical head that has an optical path length adjusting function and a signal amplification effect.

An optical head of the present invention basically comprises: a light source such as a semiconductor laser or the like; a splitting means, such as a polarization beam splitter or the like, that splits light that is emitted from the light source into first and second light beams; a focusing means, such as an objective lens or the like, that focuses the first light beam on an optical recording medium, such as an optical disk or the like; a reflecting means, such as a corner cube prism or the like, that reflects the second light beam; an adjusting means, such as a wedge prism or the like, that adjusts the optical path length of the first light beam or of the second light beam; an optical system, such as a polarization beam splitter or the like, that combines the first light beam reflected from the optical recording medium and the second light beam, and generates a plurality of interference light beams that occur due to interference therebetween; a detector that detects each of the generated interference light beams; and a movable portion, such as a voice coil motor or the like, that integrally displaces the focusing means and the reflecting means.

The above-mentioned movable portion is controlled by a focusing error signal or the like in such a manner that it follows the surface position fluctuation of the optical disk, and the first light beam is always in focus on a recording layer of the optical disk by means of the objective lens mounted on the movable portion. Here, the surface position fluctuation of the optical disk causes the optical path length of the first light beam to vary. However, since the reflecting means of the second light beam is integrally mounted on the movable portion, the optical path length of the second light beam varies simultaneously when the movable portion follows the surface position fluctuation. As a result, the optical path length difference between the first light beam and the second light beam remains constant.

The optical path length of the first light beam varies not only with the surface position fluctuation of the optical disk, but also when, for example, the recording layer to be read is changed in a multi-layered optical disk comprising a plurality of recording layers, and the like. In order to prevent the light reflected from the plurality of recording layers from interfering, thus subjecting the readout signal to disturbance, the gap between recording layers must at least be kept at a certain level in a multi-layered optical disk. The gap between recording layers in currently commercially available optical disks is on the order several tens of μm. The gap between the farthest two recording layers in multi-layered optical disks, too, would have to be about the same or greater. Therefore, the change in the optical path length of the first light beam when the recording layer to be read is changed would be on the order of several tens of μm to several hundreds of μm. Thus, the light interference effect is weakened, thereby causing signal quality degradation. For this reason, a means that adjusts the optical path length of the first light beam or of the second light beam is provided, and adjustment is so performed that the optical path length difference would not vary even when the recording layer to be read is changed.

According to the present invention, it is possible to provide an interference-type optical head and an optical disk apparatus which can be manufactured in sizes comparable to conventional optical heads, are capable of reading multi-layered optical disks and optical disks of a plurality of standards, and have a signal amplification effect.

DETAILED DESCRIPTION OF THE PREFERRED EMBODIMENTS

Embodiments of the present invention are described below with reference to the drawings.

Embodiment 1

Figure 1:
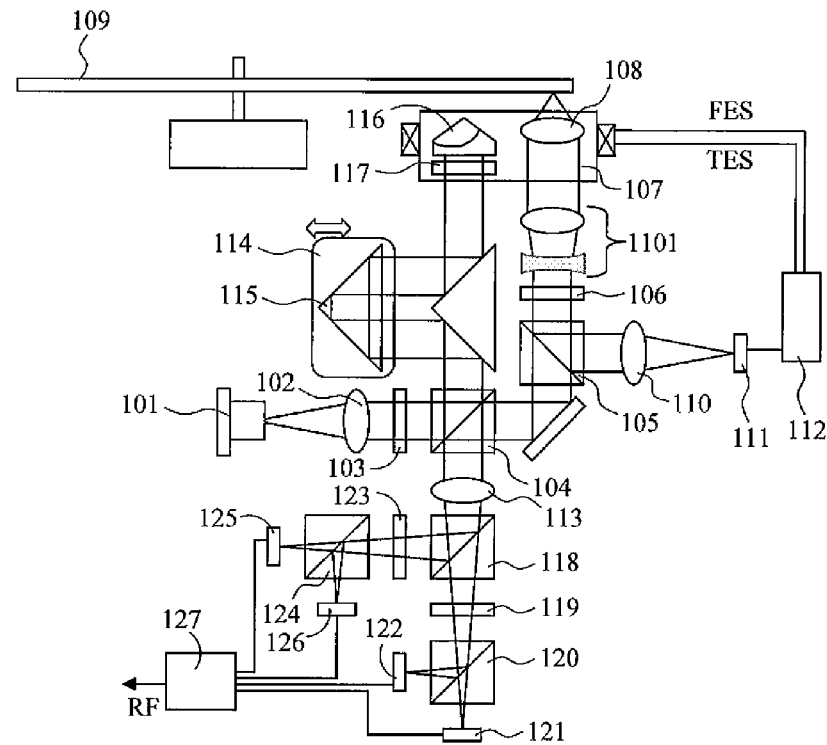
FIG. 1 is a schematic view indicating one example of an optical head of the present invention.

FIG. 1 is a schematic view indicating a basic embodiment of an optical head of the present invention. Light from a semiconductor laser 101 is collimated by a collimation lens 102, is transmitted through a half-wave plate 103, and enters a polarization beam splitter 104. The polarization beam splitter 104 has functions of transmitting substantially 100% of the p-polarization (hereinafter referred to as horizontal polarization) incident on the splitting surface, and of reflecting substantially 100% of the s-polarization (hereinafter referred to as vertical polarization) incident on the splitting surface. Here, the intensity ratio of transmitted light to reflected light can be adjusted by adjusting the rotation angle of the half-wave plate about the optical axis. The transmitted light first enters a special polarization beam splitter 105. The special polarization beam splitter 105 has such a property where 100% of the horizontal polarization is transmitted, and the vertical polarization is partly reflected and partly transmitted. As a result, 100% of the incident light is transmitted, transmits through a quarter-wave plate 106 to be converted into circular polarization, passes through a beam expander 1101 that corrects for spherical aberration, and is focused on a recording layer on an optical disk 109 by an objective lens 108 mounted on a two-dimensional actuator 107. The reflected light from the optical disk returns by the same optical path, is collimated by the objective lens 108, and is converted by the quarter-wave plate 106 into linear polarization whose polarization direction is rotated by 90° relative to when it first entered the quarter-wave plate 106. Next, the light enters the special polarization beam splitter 105, where it is partly transmitted and partly reflected due to the property mentioned above. The reflected light enters a detector 111 by means of a cylindrical lens 110.

Figure 2:
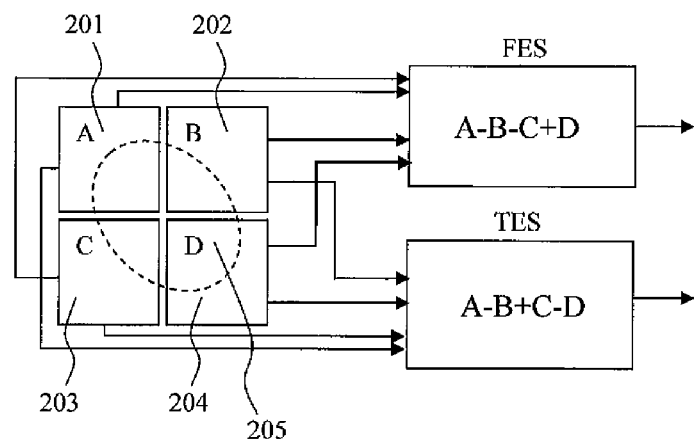
FIG. 2 is a diagram showing details of a detector for servo detection.

Here, the detector 111 is divided into four detectors 201, 202, 203, and 204 as shown in FIG. 2. As shown in the figure, assuming their respective output signals are A, B, C, and D, the signal (A−B−C+D) as a focusing error signal FES and the signal (A−B+C−D) as a tracking error signal TES from a calculation circuit 112 are each fed back as an electric current to a voice coil motor of the two-dimensional actuator 107.

On the other hand, the light transmitted by the special polarization beam splitter 105 enters the polarization beam splitter 104. Then, because its polarization is rotated by 90°, it is reflected and enters a focusing lens 113. On the other hand, the light that is emitted from the semiconductor laser 101 and reflected by the polarization beam splitter 104 is reflected by a reflecting prism 115 mounted on a movable portion 114 and enters a corner cube prism 116 mounted on the two-dimensional actuator 107. A corner cube prism is a component that reflects incident light in the opposite direction. Here, the incident light is such that its optical axis is made incident on the apex formed by the three reflective surfaces of the corner cube prism 116. As a result, the reflected light returns by the same optical path and enters the polarization beam splitter 104. Here, the polarization and wavefront of the light are disturbed by the corner cube prism. Therefore, such disturbances are compensated for and the polarization of the return path light relative to the original path light is rotated by 90° by a polarization compensation component 117 inserted along the optical path. As a result, the reflected light from the corner cube prism is transmitted by the polarization beam splitter 104 and enters the focusing lens 113 in such a manner that its optical axis is collinear with that of the reflected light from the optical disk while being mutually orthogonal in polarization.

Each of the two lights entering the focusing lens is reflected and transmitted by a non-polarization beam splitter 118 in a ratio of 1 to 1. The transmitted light has its polarization rotated by 45° by being transmitted through a half-wave plate 119, and is then split into a horizontal polarization component and a vertical polarization component by a polarization beam splitter 120. The respective split lights are detected by detectors 121 and 122. The light reflected by the non-polarization beam splitter 118 passes through a quarter-wave plate 123, and is then split into a horizontal polarization component and a vertical polarization component by a polarization beam splitter 124. The respective split lights are detected by detectors 125 and 126. The detection signals of the detectors 121, 122, 125, and 126 are input to a calculation circuit 127, and an amplified readout signal of the optical disk is obtained as an output of the calculation circuit.

Figure 3A:
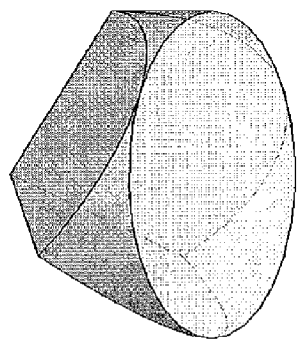
FIGS. 3A and 3B are diagrams indicating the external form of a corner cube prism.
Figure 3B:
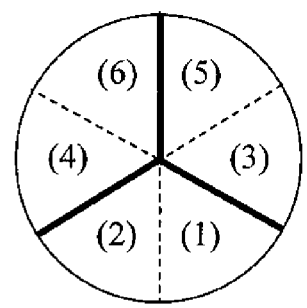

Polarization compensation by a corner cube prism is described in detail below. As shown in FIG. 3A, a corner cube prism is a component in which three surfaces of a cube are configured by cutting out a medium such as glass or the like. Light entering a corner cube prism is reflected by these three surfaces, and is emitted as return light in a direction that is the opposite of that of the incident light. Here, reflection at each reflecting surface satisfies a total reflection condition. Thus, a predetermined phase difference in accordance with the incident angle occurs between p-polarization and s-polarization with respect to the incident surface. As a result, the polarization and wavefront of the return light are disturbed. Further, depending on the position from which light enters, the order of reflection among the three reflecting surfaces is different. As a result, the manner in which polarization is disturbed is different. FIG. 3B is a diagram of a corner cube as viewed from the direction from which light enters. At each of the regions (1), (2), (3), (4), (5), and (6) shown here, a different polarization disturbance occurs. The thick lines in the diagram represent borders between the reflecting surfaces.

Figure 4:
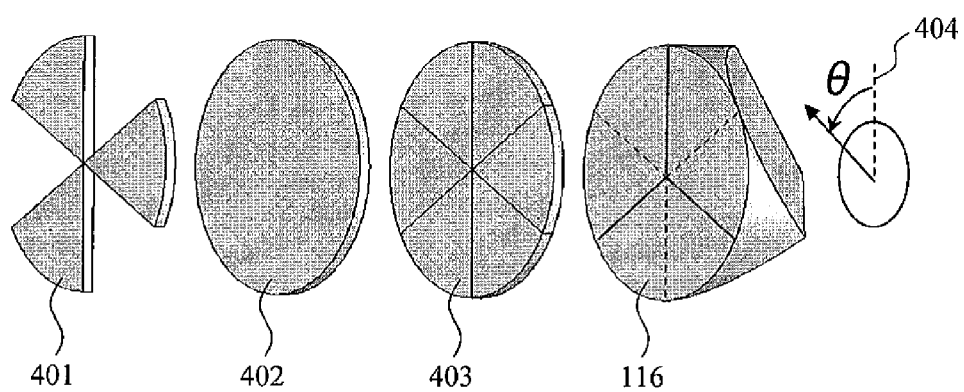
FIG. 4 is a diagram illustrating correction of polarization disturbance in a corner cube prism.

In order to correct therefor, the polarization compensation component 117 comprising, as shown in FIG. 4, a three-segmented phase plate 401, a quarter-wave plate 402, and a six-segmented half-wave plate 403 may be inserted. The quarter-wave plate and the six-segmented half-wave plate serve the functions of not only polarization compensation but also of rotating the polarization of the return light by 90° relative to the incident light. In addition, the three-segmented phase plate imparts a predetermined phase difference ($\phi_p - \phi_s$, where $\phi_p$ and $\phi_s$ are the phases imparted on the horizontal polarization and the vertical polarization, respectively) between the horizontal polarization and vertical polarization of a specific region. The three-segmented phase plate serves to compensate for, upon entry, the phase difference between regions of this component that are passed and regions that are not passed, and to align the wavefront of the return light. As an example, Table 1 shows setting values of the three-segmented phase plate, the quarter-wave plate, and the six-segmented half-wave plate in a case where the wavelength of the light is 405 nm and the medium of a corner cube prism is BK7. As shown in FIG. 4, angles are defined in such a manner that a vertical polarization direction 404 is taken to be 0°, and the anti-clockwise direction as viewed from the direction from which light enters is taken to be positive.

TABLE 1

| Region | Retardation of three-segmented phase plate $\phi_p - \phi_s$ [degrees] | Angle of fast axis direction of quarter waveplate [degrees] | Angle of fast axis direction of six-segmented half waveplate [degrees] |
| --- | --- | --- | --- |
| (1) | 0 | −17.7 | 28.6 |
| (2) | −33 | | −1.4 |
| (3) | 0 | | 58.6 |
| (4) | −33 | | 58.6 |
| (5) | 0 | | −1.4 |
| (6) | −33 | | 28.6 |

The process of obtaining an amplified signal through interference of light is explained in detail below. The light entering the focusing lens 113 is one in which the return light from the corner cube prism 116, which is a horizontal polarization, and the return light from the optical disk 109, which is a vertical polarization, have become collinear. Therefore, the polarization state of the light may be expressed as a Jones vector as follows.

$$\begin{pmatrix} E_r \\ E_s \end{pmatrix} \qquad (1)$$

Here, $E_s$ is the electric field of the return light from the optical disk, and $E_r$ is the electric field of the return light from the corner cube prism. In addition, the first component of this vector represents horizontal polarization, and the second component represents vertical polarization. This light is split in two by the non-polarization beam splitter. The transmitted light passes through the half-wave plate that has a fast axis in a direction at 22.5° with respect to the horizontal polarization direction. Here, the Jones vector would be as follows.

$$\begin{pmatrix} \cos 45° & -\sin 45° \\ \sin 45° & \cos 45° \end{pmatrix} \begin{pmatrix} E_r/\sqrt{2} \\ E_s/\sqrt{2} \end{pmatrix} = \begin{pmatrix} (E_r - E_s)/2 \\ (E_r + E_s)/2 \end{pmatrix} \quad (2)$$

Next, the horizontal polarization component is transmitted by the polarization beam splitter, while the vertical polarization component is reflected. Thus, the electric fields of the transmitted light and the reflected light are expressed by the following equations, respectively.

$$\frac{1}{2}(E_r - E_s) \quad (3)$$

$$\frac{1}{2}(E_r + E_s) \quad (4)$$

On the other hand, the light reflected by the non-polarization beam splitter passes through the quarter-wave plate that has a fast axis in a direction at 45° with respect to the horizontal polarization direction. Here, the Jones vector is expressed by the following equation.

$$\frac{1}{\sqrt{2}} \begin{pmatrix} i - \cos 90° & \sin 90° \\ \sin 90° & i + \cos 90° \end{pmatrix} \begin{pmatrix} E_r/\sqrt{2} \\ -E_s/\sqrt{2} \end{pmatrix} = \begin{pmatrix} i(E_r + iE_s)/2 \\ (E_r - iE_s)/2 \end{pmatrix} \quad (5)$$

Next, the horizontal polarization component is transmitted by the polarization beam splitter, while the vertical polarization component is reflected. Thus, the electric fields of the transmitted light and the reflected light are expressed by the following equations, respectively.

$$\frac{1}{2}(E_r + iE_s) \quad (6)$$

$$\frac{1}{2}(E_r - iE_s) \quad (7)$$

Therefore, the detection signals of the four detectors 121, 122, 125, and 126 are expressed as follows, respectively.

$$\eta \left|\frac{1}{2}(E_r - E_s)\right|^2 = \eta\left(\frac{1}{4}|E_r|^2 + \frac{1}{4}|E_s|^2 - \frac{1}{2}|E_r E_s|\cos\Delta\phi\right) \quad (8)$$

$$\eta \left|\frac{1}{2}(E_r + E_s)\right|^2 = \eta\left(\frac{1}{4}|E_r|^2 + \frac{1}{4}|E_s|^2 + \frac{1}{2}|E_r E_s|\cos\Delta\phi\right) \quad (9)$$

$$\eta \left|\frac{1}{2}(E_r + iE_s)\right|^2 = \eta\left(\frac{1}{4}|E_r|^2 + \frac{1}{4}|E_s|^2 + \frac{1}{2}|E_r E_s|\sin\Delta\phi\right) \quad (10)$$

$$\eta \left|\frac{1}{2}(E_r - iE_s)\right|^2 = \eta\left(\frac{1}{4}|E_r|^2 + \frac{1}{4}|E_s|^2 - \frac{1}{2}|E_r E_s|\sin\Delta\phi\right) \quad (11)$$

$\eta$ is the conversion efficiency of the detectors. If these are respectively represented as $D_1$, $D_2$, $D_3$, and $D_4$, an output as expressed by the following equation is obtained at the calculation circuit 127.

$$\sqrt{(D_1 - D_2)^2 + (D_3 - D_4)^2} = |E_s||E_r| \quad (12)$$

This output has a form where the electric field of the light reflected from the optical disk (hereinafter referred to as signal light) is amplified by the electric field of the return light from the corner cube (hereinafter referred to as reference light). Thus, even in cases where $E_s$ is small for such reasons as low reflectivity of an optical disk and where a signal cannot be read out correctly by detecting the signal light directly, it becomes possible to amplify and correctly read out the signal.

Figure 13:
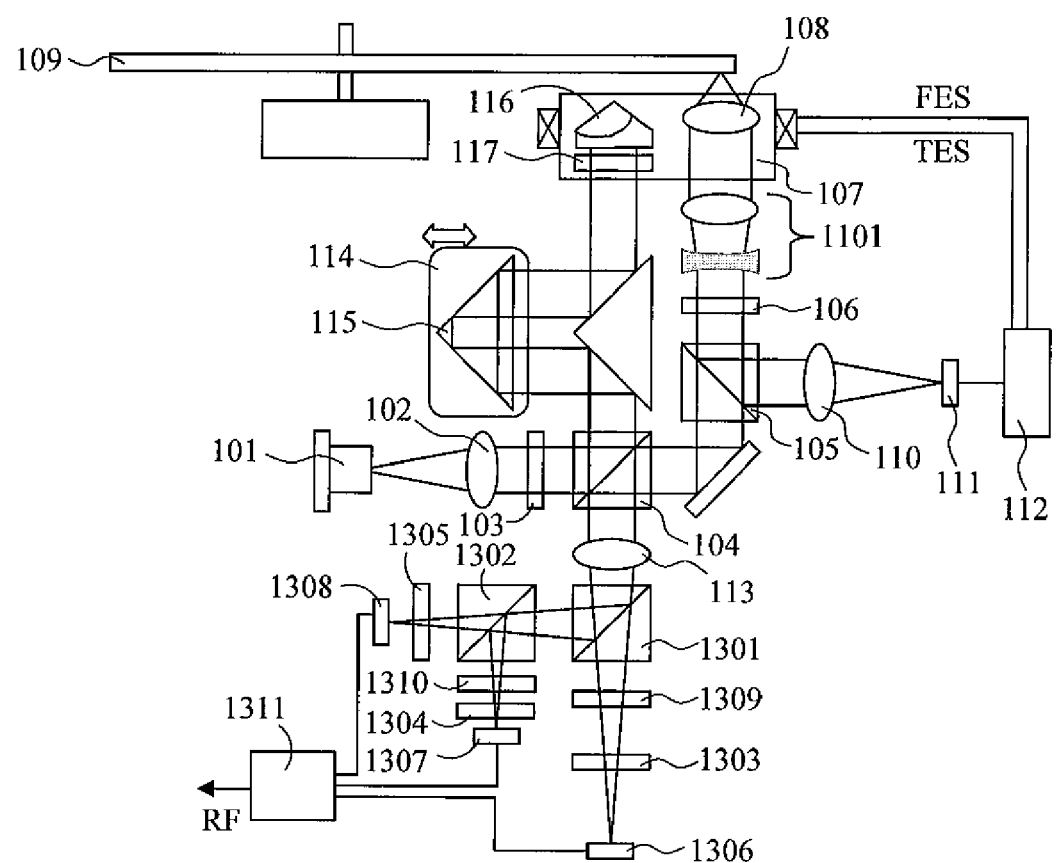
FIG. 13 is a diagram indicating an embodiment in which an interference signal output is obtained from three detector outputs.

It is noted, however, that the number of detectors and the phase difference between the signal light and the reference light at each of the detectors need not be as described above in order to achieve the present effect. In principle, one need only perform detection with three or more detectors and in such a manner that the phase differences between the signal light and the reference light be mutually different among the detectors. As an example, FIG. 13 shows a detection method in a case where three detectors are used, and the phase differences between the signal light and the reference light at the detectors are 0°, 120°, and 240°, respectively. The light that passes through the focusing lens 113 is split into three light beams by non-polarization beam splitters 1301 and 1302. The light beams pass through polarizers 1303, 1304, and 1305, each of which transmits 45° polarization. The light beams are then detected by detectors 1306, 1307, and 1308. Of these three light beams, one has a phase plate 1309, which causes a phase difference of 120° between the signal light and the reference light, inserted therein, and another has a phase plate 1310, which causes a phase difference of 240° between the signal light and the reference light, inserted therein. In addition, in order to make the quantity of light be equal at each of the detectors, a component whose ratio of transmissivity to reflectivity would be 1 to 2 is used for the non-polarization beam splitter 1301, and a component whose transmissivity and reflectivity would be equal is used for the non-polarization beam splitter 1302. Detection signals are input to an RF signal calculation circuit 1311, and an RF signal is obtained as a calculated output. Here, the intensities of the lights incident on the detectors may be expressed by the following equations, respectively.

$$I_{PD1} = \left|\frac{1}{\sqrt{3}}E_{sig} + \frac{1}{\sqrt{3}}E_{ref}\right|^2 \quad (13\text{-}1)$$
$$= \frac{1}{3}|E_{sig}|^2 + \frac{1}{3}|E_{ref}|^2 + \frac{2}{3}|E_{sig}||E_{ref}|\cos(\varphi_{sig} - \varphi_{ref})$$

$$I_{PD2} = \left|\frac{1}{\sqrt{3}}E_{sig} + \frac{1}{\sqrt{3}}e^{\frac{2\pi}{3}i}E_{ref}\right|^2 \quad (13\text{-}2)$$
$$= \frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} - \frac{2}{3}\pi\right)$$

$$I_{PD3} = \left|\frac{1}{\sqrt{3}}E_{sig} + \frac{1}{\sqrt{3}}e^{-\frac{2\pi}{3}i}E_{ref}\right|^2 \quad (13\text{-}3)$$
$$= \frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} + \frac{2}{3}\pi\right)$$

It is possible to obtain from the detection signals of these lights an amplified signal that is not dependent on the phase difference between the signal light and the reference light as expressed by the following equation.

$$S = \sqrt{\left(I_{PD1} - \frac{I_{PD2} + I_{PD3}}{2}\right)^2 + 3\left(\frac{I_{PD2} - I_{PD3}}{2}\right)^2} \quad (14)$$
$$= |E_{sig}||E_{ref}|$$

Here, equation (12) and equation (14) express outputs for a case in which there is ideal interference between the signal light and the reference light. However, due to the fact that interference is incomplete in reality, these outputs decrease. What realistically become problems as causes of incompleteness of interference are misalignment in optical axis direction and discrepancy in optical path length between the two interfering lights. The former is prevented by employing the corner cube prism. Since the signal light is reflected after being focused on the optical disk, the optical axis direction is always the opposite of that of the original path light. Similarly, since the reference light is also reflected from the corner cube prism, the optical axis direction is the opposite of that of the original path light. Since the original path lights are originally emitted from a single light source, if the signal light and the reference light travel in directions that are the opposite of those of their original paths, their optical axis directions will invariably align when they are combined at the polarization beam splitter.

Next, the latter optical path length difference discrepancy is explained below. When the light source is not an ideal monochromatic light source, the coherence length is finite. As a result, when two interfering lights differ in optical path length, the degree of interference decreases. The coherence length of laser diodes generally in use in optical disk apparatuses is approximately 100 µm. Thus, not only does the output signal decrease significantly due to optical path length fluctuations of approximately ±600 µm corresponding to surface position fluctuations of the optical disk, but the signal waveform is also distorted in response to irregular fluctuations. For this reason, the corner cube prism is mounted on the same actuator as the objective lens. As a result, even if the optical path length of the signal light varies due to disk surface position fluctuation, the corner cube follows the optical disk along with the objective lens. Thus, an equivalent optical path length change is imparted on the reference light, thereby preventing the optical path length difference from varying. As the distance between the objective lens and the recording layer of the optical disk is uniquely determined by design, it becomes possible to make the optical path length difference always be zero through the design of the pickup.

However, when reading a multi-layered optical disk on which a plurality of recording layers exists, the above-mentioned innovation on its own is insufficient. This is because the optical path length between the objective lens and the recording layer being read varies when different recording layers are read. For this reason, the reflecting prism 115 is made movable by being mounted on the movable portion 114. Thus, by moving the reflecting prism 115 in the direction of incidence of the light, the optical path length difference is varied in accordance with the layer of a multi-layered optical disk being read, differing standards of optical disks, and the like. If the distance between the objective lens and the recording layer is known from the standard of the optical disk to be read, the reflecting prism may be moved to a position where the optical path length difference becomes zero based on that value. In addition, if the position at which the optical path length difference becomes zero is unknown due to product variations and the like, optimum adjustment may be performed by monitoring readout signal jitter of the amplified signal and the like and learning the position at which the readout signal quality is best.

Figure 5:
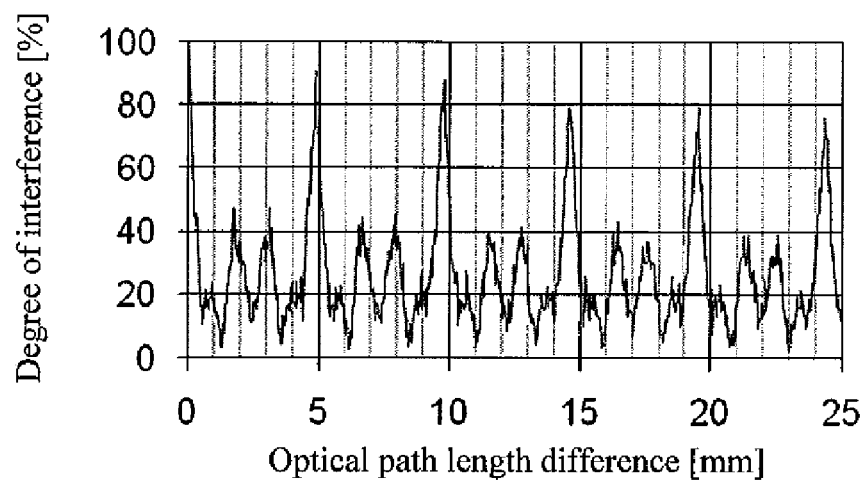
FIG. 5 is a chart indicating the relationship between degree of interference and optical path length difference with respect to a laser diode.
Figure 6:
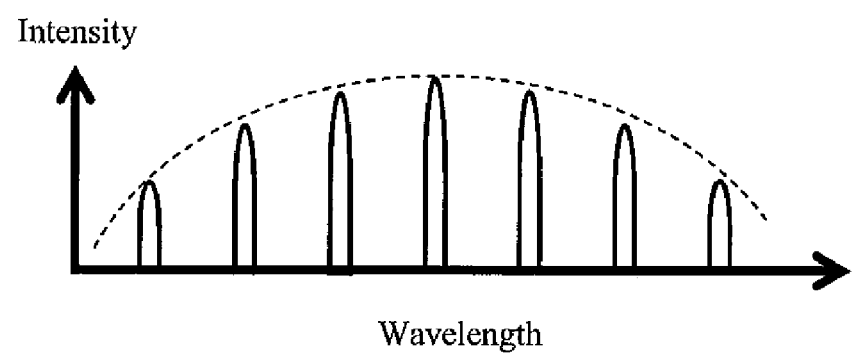
FIG. 6 is a schematic view of the spectral characteristics of a laser diode.

In the description above, it is assumed that the optical path length difference is made to be zero. However, a sufficient amplified signal may be obtained without necessarily making the optical path length difference be zero. With respect to a conventional laser diode, FIG. 5 shows a chart in which the horizontal axis represents the optical path length difference between two interfering lights, and the vertical axis represents the degree of interference as standardized against the value at which the optical path length difference is zero. Initially, when the optical path length difference increases from zero, the degree of interference falls sharply. The term "coherence length" as used in the description above refers to the optical path length difference at which the degree of interference reaches 1/e due to this fall. However, as the optical path length difference is further increased, the degree of interference improves again, and increases to almost reach 100%. Then, as the optical path length difference is further increased, the degree of interference repeats a pattern of decreasing and increasing. This is due to the fact that the oscillation spectrum of a semiconductor laser has a shape where narrow line spectra are lined up periodically as shown in FIG. 6. It is known that the curve in FIG. 5 is the Fourier transform of the spectral curve of FIG. 6. The reason periodical peaks appear in FIG. 5 is because a plurality of line spectra are lined up. The interval between peaks is on the order of several mm for a conventional laser diode. It is also possible to set the optical path length difference to the position of a different peak instead of zero. Even in such a case, a degree of interference of 90% or above can be maintained as compared to a case where the optical path length difference is zero. It is thus possible to obtain a sufficient amplification effect.

Figure 14:
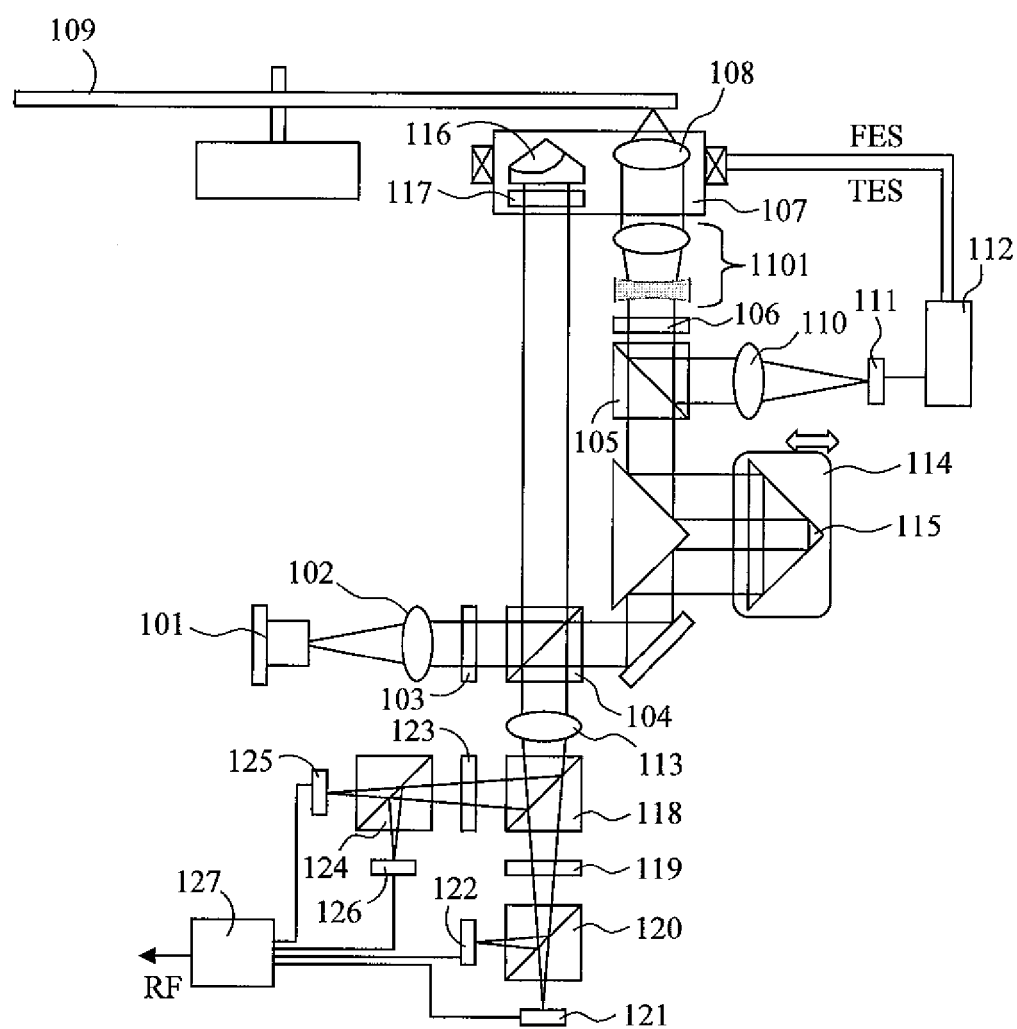
FIG. 14 is a diagram indicating an embodiment in which optical path length difference is adjusted by adjusting the optical path length of the signal light.

In addition, in the present embodiment, an example is shown where the optical path length of the reference light that is not irradiated on the optical disk is adjusted. However, the optical path length of the signal light that is irradiated on the disk may naturally be adjusted. Thus, as in FIG. 14, the reflecting prism 115 and the movable portion 114 may be inserted in the path of the signal light.

Embodiment 2

Figure 7:
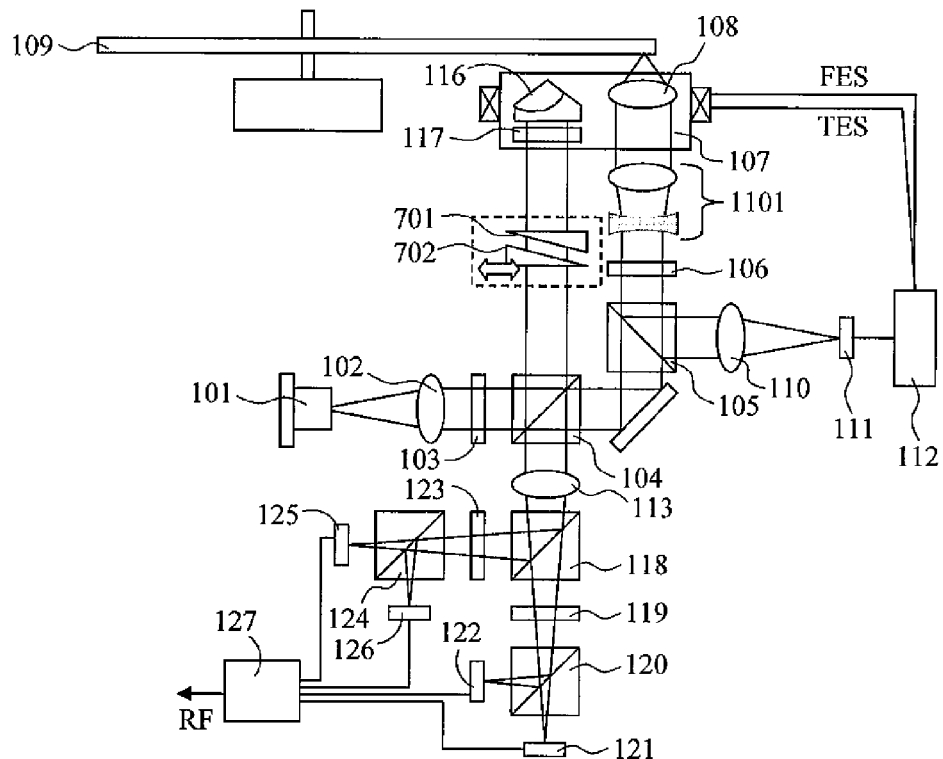
FIG. 7 is a diagram indicating another embodiment in which a pair of wedge prisms is used.

As another embodiment, FIG. 7 is a schematic diagram of an optical head that uses a pair of wedge prisms 701 and 702 for optical path length difference adjustment between the signal light and the reference light. In this case, optical path length difference adjustment may be performed by parallel movement of one of the wedge prisms in the optical axis direction or in a direction that is perpendicular to the optical axis (the direction indicated by the arrow in the figure). By using a wedge prism pair, it becomes unnecessary to fold back the optical path as in Embodiment 1. Thus, a reduction in the size of the optical system can be realized.

In addition, in the present scheme, displacement of the beam occurs, and the degree of displacement varies with the adjustment of the optical path length. However, this can be reduced to a practically negligible degree by appropriately setting the angle, medium, and the like of the wedge prisms. By way of example, a case is considered where an optical disk, which has two recording layers separated by 25 µm by a medium with a refractive index of 1.62, is read using a light source with a wavelength of 405 nm. If the wedge prism is to be moved in a direction perpendicular to the optical axis, assuming the medium of the wedge prism is BK7 and the angle is 4.37°, then the optical path length difference between when the two recording layers are read can be corrected for by moving the wedge prism by 1 mm. The displacement of the light beam in the horizontal direction in this case is 3.1 µm. This is sufficiently smaller than the beam diameter of 3 mm of the light that is used in an ordinary optical pickup, and is thus negligible. If the wedge prism is to be moved in the optical axis direction, assuming the medium of the wedge prism is BK7 and the angle is 26.3°, then comparable correction is possible by moving the wedge prism by 1 mm. The displacement of the beam in this case is 344 µm and can be ignored by making the beam diameter of the light entering the objective lens be greater than the effective diameter of the objective lens.

Figure 8:
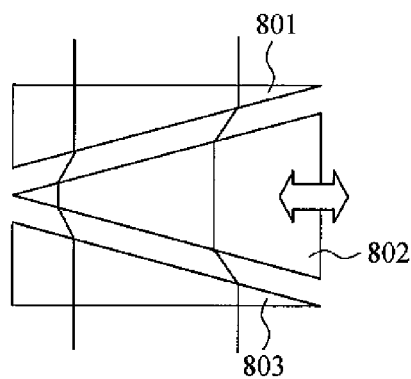
FIG. 8 is a diagram indicating a method of adjusting optical path length with three wedge prisms.
Figure 9:
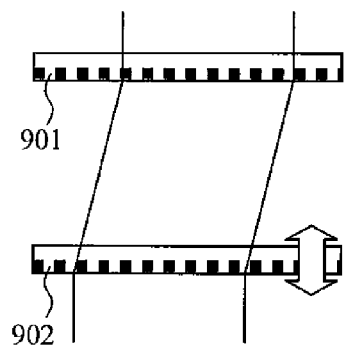
FIG. 9 is a diagram indicating a method of adjusting optical path length with a pair of diffraction gratings.
Figure 10:
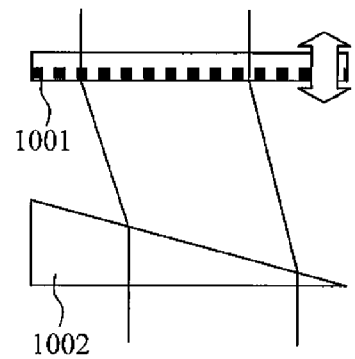
FIG. 10 is a diagram indicating a method of adjusting optical path length by means of a combination of a wedge prism and a diffraction grating.

In addition, as a configuration in which displacement does not occur, it is also possible to adopt a configuration that uses three wedge prisms 801, 802, and 803 as shown in FIG. 8. In this case, optical path length adjustment is performed by moving the middle wedge prism 802 in a direction that is perpendicular to the incident optical axis. The corrected optical path length relative to the traveled distance is twice that of the case in which two wedge prisms are used. In addition, comparable effects may be obtained through a configuration in which the wedge prisms are replaced by diffraction gratings 901 and 902 as shown in FIG. 9. In this case, it is necessary to have the two diffraction gratings blazed in such a manner that substantially 100% diffraction into the +1st order diffracted light takes place. Optical path length adjustment is performed by moving one of the diffraction gratings back and forth in the optical axis direction. By way of example, if an optical disk, which has two recording layers separated by 25 μm by a medium with a refractive index of 1.62, is read using a light source with a wavelength of 405 nm, the optical path length difference between when the two recording layers are read can be corrected for by displacing the diffraction grating by 1 mm in the optical axis direction, assuming its diffraction angle is 16.1°. In this case, the displacement of the light beam in the horizontal direction is 288 μm. In addition, it is also possible to perform optical path length adjustment with a configuration in which a diffraction grating 1001 and a wedge prism 1002 are combined as shown in FIG. 10.

Embodiment 3

Figure 11:
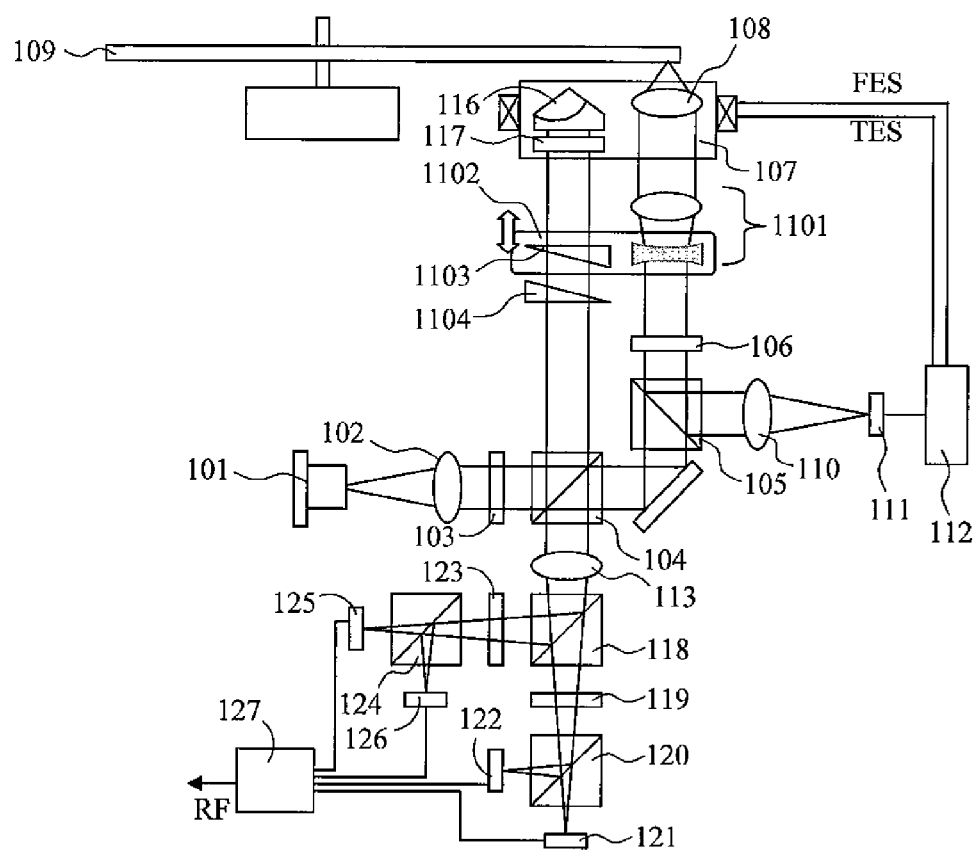
FIG. 11 is a diagram indicating another embodiment in which spherical aberration correction and optical path length adjustment are performed simultaneously.

As another embodiment, FIG. 11 is a schematic diagram of an optical head that simultaneously performs spherical aberration correction and optical path length difference adjustment of the signal light. In general, when a multi-layered optical disk is read, the distance traveled through the internal medium of the optical disk by the light varies with each recording layer. As a result, the amount of spherical aberration occurring at the optical disk varies. For this reason, the beam expander 1101 is inserted in the optical path of the signal light, and one of a pair of lenses forming the beam expander 1101 is moved in the optical axis direction. Thus, spherical aberration that cancels out the spherical aberration occurring internally in the optical disk is caused, thereby performing adjustment to make spherical aberration smallest for all recording layers.

In the present embodiment, the lens mentioned above and a component used for optical path length difference adjustment are mounted on the same movable portion 1102, and spherical aberration correction and optical path length difference adjustment are performed simultaneously. As a result, it is possible to simplify the optical system. Spherical aberration correction is also sufficiently possible with the moving distance of 1 mm in the example of Embodiment 2 in which the prism is moved in the optical axis direction.

Embodiment 4

Figure 15:
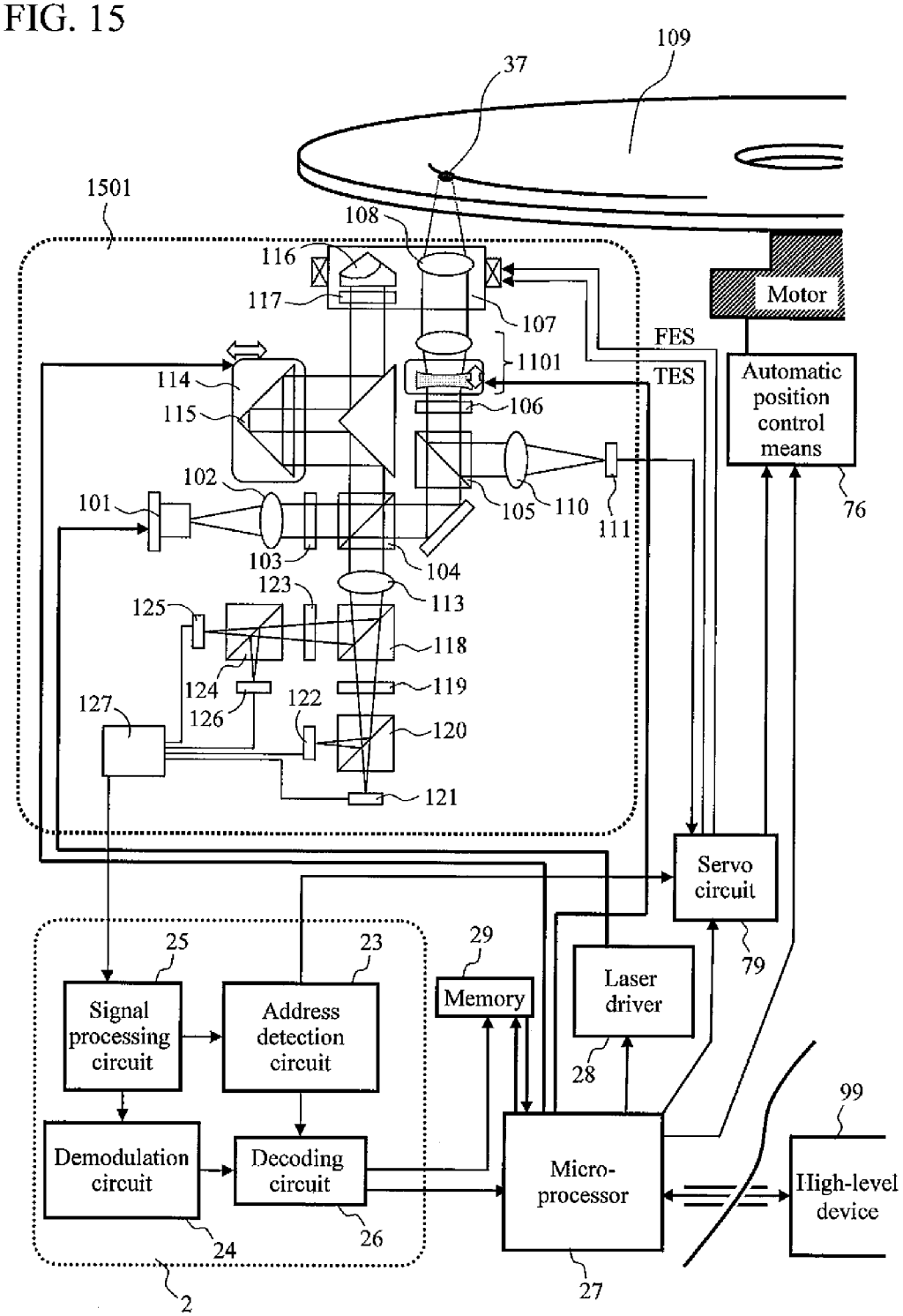
FIG. 15 is a block diagram indicating an example of an optical disk drive equipped with an optical head of the present invention.

FIG. 15 shows a block diagram of an embodiment of an optical disk apparatus of the present invention. An optical head 1501 is the same as that shown in Embodiment 1. Here, the output signals D1, D2, D3, and D4 of the four detectors 121, 122, 125, and 126 are input to a signal processing circuit 25. Here, calculations of D1−D2 and D3−D4 are processed through analogue calculation at the calculation circuit 127. Subsequent processing is performed through digital calculation. In other words, part of the processing of equation (12) above is performed through digital calculation. A readout signal S generated through the calculation of equation (12) is subjected to appropriate digital equalization processing, then input to a demodulation circuit 24 and an address detection circuit 23, and sent by a decoding circuit 26 to a memory 29 and a micro-processor 27 as user data.

Under the instruction of a high-level device 99, the micro-processor 27 controls any given servo circuit 79 and automatic position control means 76 to position a light spot 37 at a given address. In accordance with whether the instruction from the high-level device is to read or to write, the micro-processor 27 controls a laser driver 28, and makes the laser 101 emit light with an appropriate power/waveform. The servo circuit 79 controls the two-dimensional actuator 107 based on the servo signals FES and TES. In addition, the micro-processor 27 controls the movable portion 114 based on signal quality or disk information, and adjusts it to a place where the optical path length difference is smallest, in other words, where signal output is greatest. When the light spot 37 is shifted from one recording layer to another recording layer of the multi-layered optical disk, the micro-processor 27 synchronously controls the position of the movable portion 114, on which the reflecting prism 115 is mounted, and the movement of the beam expander 1101, which corrects for the spherical aberration of the signal light.

Embodiment 5

Figure 12:
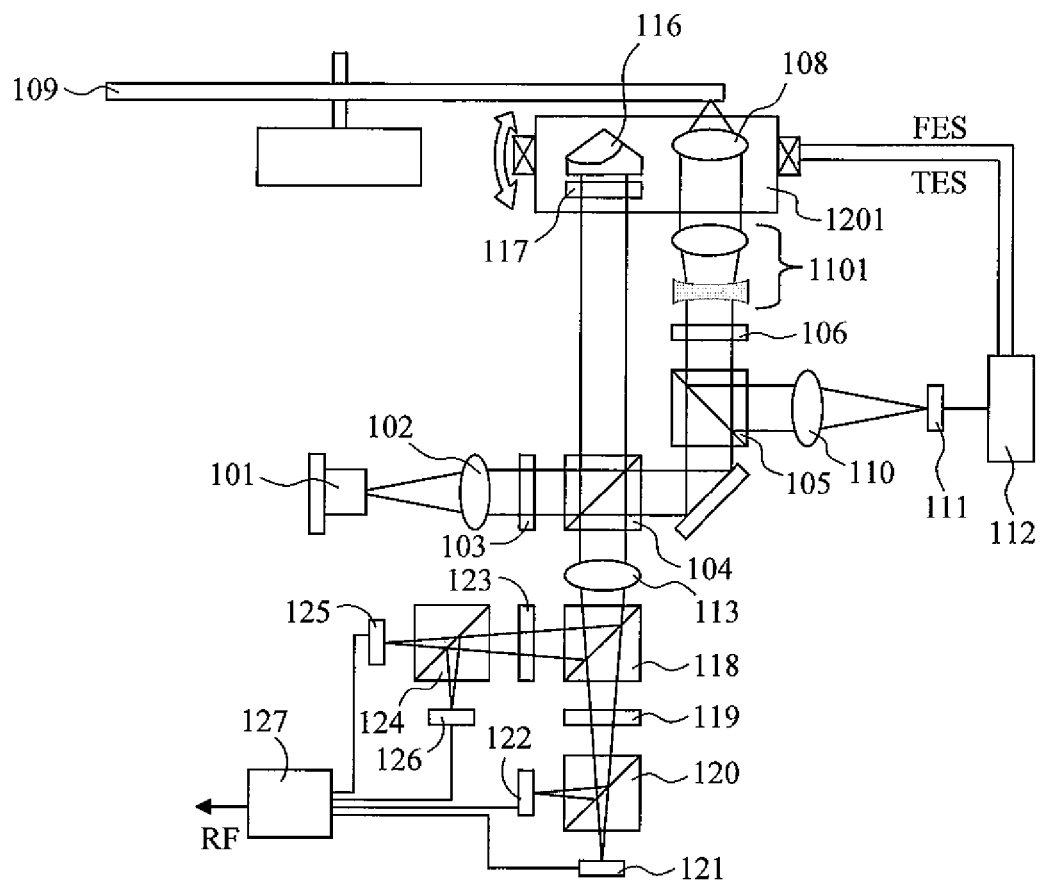
FIG. 12 is a diagram indicating another embodiment in which optical path length is adjusted by adjusting the tilt angle of an actuator on which an objective lens is mounted.

As another embodiment, FIG. 12 is a schematic diagram of a case in which optical path length adjustment is performed by adjusting the tilt angle of a three-dimensional actuator 1201 on which the objective lens and the corner cube prism are mounted. The three-dimensional actuator 1201 is tiltable in the direction indicated by the arrow in the figure. Optical path length difference adjustment is thus possible. By way of example, if an optical disk, which has two recording layers separated by 25 μm by a medium with a refractive index of 1.62, is read using a light source with a wavelength of 405 nm, the optical path length difference between when the two recording layers are read can be corrected for by tilting the three-dimensional actuator 1201 by 0.46°, assuming the distance between the center of the objective lens and the center of the corner cube prism is 5 mm.

Figure 16:
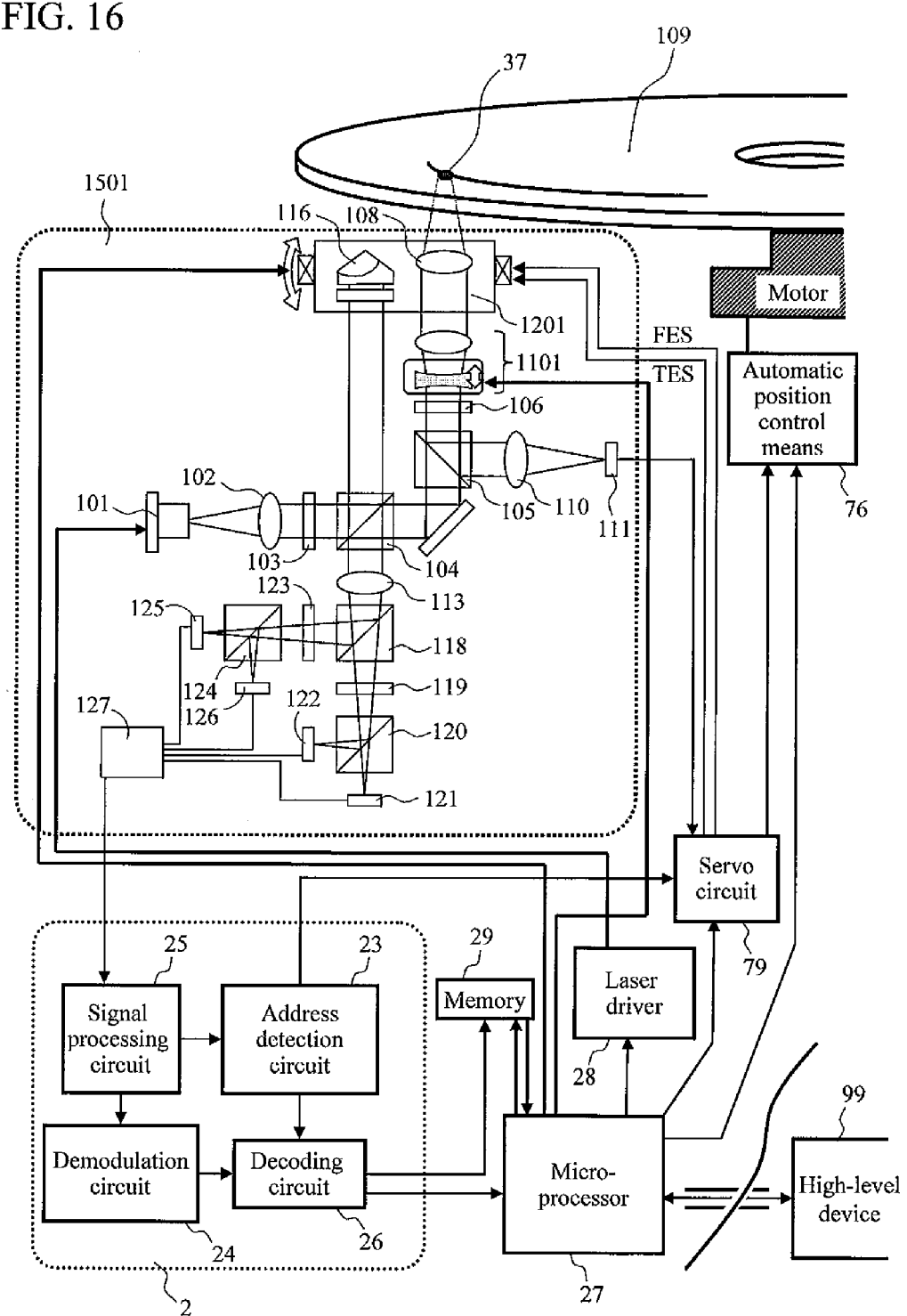
FIG. 16 is a block diagram indicating an example of an optical disk drive equipped with an optical head of the present invention.

The tilt adjustment mechanism is based on a block diagram such as that shown in FIG. 16. The block diagram is the same as that of Embodiment 4, but the micro-processor 27 adjusts the tilt of the three-dimensional actuator 1201 instead of the movable portion 114. When the light spot 37 is shifted from one recording layer to another recording layer of the multi-layered optical disk, the micro-processor 27 synchronously controls the tilt angle of the three-dimensional actuator 1201 and the movement of the beam expander 1101, which corrects for the spherical aberration of the signal light.

According to the present invention, detection of stable and high-quality readout signals of large-capacity multi-layered high-speed optical disks becomes possible. Wide-ranging industrial applications such as large-capacity video recorders, hard-disk data back-up devices, stored information archiving devices, and the like are expected.

DESCRIPTION OF REFERENCE NUMERALS 2 readout signal processing block
23 address detection circuit 24 demodulation circuit
25 signal processing circuit
26 decoding circuit
27 micro-processor
28 laser driver
29 memory
79 servo circuit
76 automatic position control means
99 high-level device
101 semiconductor laser
102 collimation lens
103 half-wave plate
104 polarization beam splitter
105 special polarization beam splitter
106 quarter-wave plate
107 two-dimensional actuator
108 objective lens
109 optical disk
110 focusing lens
111 detector
112 calculation circuit
113 focusing lens
114 movable portion
115 reflecting prism
116 corner cube prism
117 polarization compensation component
118 non-polarization beam splitter
119 half-wave plate
120 polarization beam splitter
121, 122 detectors
123 quarter-wave plate
124 polarization beam splitter
125, 126 detectors
127 calculation circuit
201, 202, 203, 204 light receiving portions
205 incident beam
401 three-segmented phase plate
402 quarter-wave plate
403 six-segmented half-wave plate
404 vertical polarization direction
701, 702, 801, 802, 803 wedge prisms
901, 902, 1001 diffraction gratings
1002 wedge prism
1101 beam expander
1102 movable portion
1103, 1104 wedge prisms
1201 three-dimensional actuator
1301, 1302 non-polarization beam splitters
1303, 1304, 1305 polarizers
1306, 1307, 1308 detectors
1309, 1310 phase plates
1311 calculation circuit
1501 optical head

What is claimed is:

1. An optical head, comprising:
a light source;
a splitting means that splits light emitted from the light source into first and second light beams;
a focusing means that focuses the first light beam on an optical recording medium;
a reflecting means that reflects the second light beam;
an adjusting means that adjusts an optical path length of the first light beam or of the second light beam;
an optical system that combines the first light beam reflected from the optical recording medium and the second light beam, and that generates a plurality of interference light beams caused by interference of the first light beam and the second light beam;
a plurality of detectors that detect each of the generated interference light beams; and
a first movable portion that integrally displaces the focusing means and the reflecting means, independently of the optical system.

2. The optical head according to claim 1, wherein
the adjusting means is one of a plurality of wedge prisms, a plurality of diffraction gratings, and a combination of a wedge prism and a diffraction grating, and
a part of the adjusting means is displaced to adjust the optical path length.

3. The optical head according to claim 1, wherein the adjusting means adjusts a tilt of the first movable portion.

4. An optical head, comprising:
a light source;
a splitting means that splits light emitted from the light source into first and second light beams;
a focusing means that focuses the first light beam on an optical recording medium;
a reflecting means that reflects the second light beam;
an adjusting means that adjusts an optical path length of the first light beam or of the second light beam;
an optical system that combines the first light beam reflected from the optical recording medium and the second light beam, and that generates a plurality of interference light beams caused by interference of the first light beam and the second light beam;
a plurality of detectors that detect each of the generated interference light beams; and
a first movable portion that integrally displaces the focusing means and the reflecting means,
further comprising a correction optical system that corrects for spherical aberration of the first light beam by moving optical components by a second movable portion, wherein
a first optical component, which is a part of the correction optical system, and a second optical component, which is a part of the adjusting means, are mounted on the second movable portion, and are integrally displaced to correct for the spherical aberration and adjust the optical path length.

5. An optical disk apparatus, comprising:
an optical head including a light source, a splitting means that splits light emitted from the light source into first and second light beams, a focusing means that focuses the first light beam on an optical recording medium, a reflecting means that reflects the second light beam, an adjusting means that adjusts an optical path length of the first light beam or of the second light beam, an optical system that combines the first light beam reflected from the optical recording medium and the second light beam and that generates a plurality of interference light beams caused by interference of the first light beam and the second light beam, a plurality of detectors that detect each of the generated interference light beams, and a first movable portion that integrally displaces the focusing means and the reflecting means, independently of the optical system;
a control portion that controls a position of the first movable portion and a light-emitting state of the light source, and
a signal processing portion that generates a readout signal from an output signal of the detectors.

6. The optical disk apparatus according to claim 5, wherein the optical head further includes a correction optical system that corrects for spherical aberration of the first light beam, and the control portion synchronously controls the correction optical system and the position of the first movable portion.

7. The optical disk apparatus according to claim 5, wherein the adjusting means is one of a plurality of wedge prisms, a plurality of diffraction gratings, and a combination of a wedge prism and a diffraction grating, and adjusts the optical path length by displacing a part of the adjusting means.

8. The optical disk apparatus according to claim 5, wherein the adjusting means adjusts a tilt of the first movable portion.

9. An optical disk apparatus comprising:

an optical head including a light source, a splitting means that splits light emitted from the light source into first and second light beams, a focusing means that focuses the first light beam on an optical recording medium, a reflecting means that reflects the second light beam, an adjusting means that adjusts an optical path length of the first light beam or of the second light beam, an optical system that combines the first light beam reflected from the optical recording medium and the second light beam and that generates a plurality of interference light beams caused by interference of the first light beam and the second light beam, a plurality of detectors that detect each of the generated interference light beams, and a first movable portion that integrally displaces the focusing means and the reflecting means;

a control portion that controls a position of the first movable portion and a light-emitting state of the light source, and a signal processing portion that generates a readout signal from an output signal of the detectors, further comprising a correction optical system that corrects for spherical aberration of the first light beam by moving optical components by a second movable portion, wherein a first optical component, which is a part of the correction optical system, and a second optical component, which is a part of the adjusting means, are mounted on the second movable portion, and are integrally displaced to correct for the spherical aberration and adjust the optical path length.

* * * * *